(12) United States Patent
Dalmia

(10) Patent No.: US 11,757,605 B2
(45) Date of Patent: *Sep. 12, 2023

(54) INEGRATED CIRCUITS AND METHOD FOR MAINTAINING A CHANNEL IN AN ALIVE STATE DURING LOW POWER MODES

(71) Applicant: Marvell Asia Pte, Ltd., Santa Clara, CA (US)

(72) Inventor: Kamal Dalmia, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,299

(22) Filed: Jan. 11, 2021

(65) Prior Publication Data

US 2021/0243001 A1 Aug. 5, 2021

Related U.S. Application Data

(63) Continuation of application No. 15/228,161, filed on Aug. 4, 2016, now Pat. No. 10,892,880, which is a continuation of application No. 13/268,236, filed on Oct. 7, 2011, now abandoned.

(51) Int. Cl.
| | |
|---|---|
| *H04L 5/14* | (2006.01) |
| *G06F 1/3203* | (2019.01) |
| *H04B 1/40* | (2015.01) |
| *H04L 12/40* | (2006.01) |

(52) U.S. Cl.
CPC .............. *H04L 5/14* (2013.01); *G06F 1/3203* (2013.01); *H04B 1/40* (2013.01); *H04L 12/40039* (2013.01)

(58) Field of Classification Search
CPC ......... G06F 1/325; G06F 1/3203; H04B 1/40; H04L 5/14; H04L 5/16; H04L 12/12; H04L 12/40039
USPC ................... 370/201, 252, 318; 713/320, 323
See application file for complete search history.

(56) References Cited

U.S. PATENT DOCUMENTS

| | | | |
|---|---|---|---|
| 2009/0204836 A1* | 8/2009 | Diab | H04L 12/12 713/323 |
| 2009/0282277 A1* | 11/2009 | Sedarat | G06F 1/325 713/320 |
| 2012/0320771 A1* | 12/2012 | Chini | H04L 12/12 370/252 |

* cited by examiner

*Primary Examiner* — Harun Chowdhury

(57) ABSTRACT

A bidirectional transceiver integrated circuit (IC) includes a transmit circuit configured to transmit during a data transfer mode of operation first data over a first bidirectional communication channel to a link partner. The transmit circuit is configured, during a low power mode of operation, to transmit an encoded refresh signal over the first bidirectional communication channel to the link partner. A receiver circuit is configured to receive during the data transfer mode of operation second data independent of the first data over the first bidirectional communication channel. An encoder is configured, during the low power mode of operation, to encode third data into a refresh signal to generate the encoded refresh signal.

18 Claims, 6 Drawing Sheets

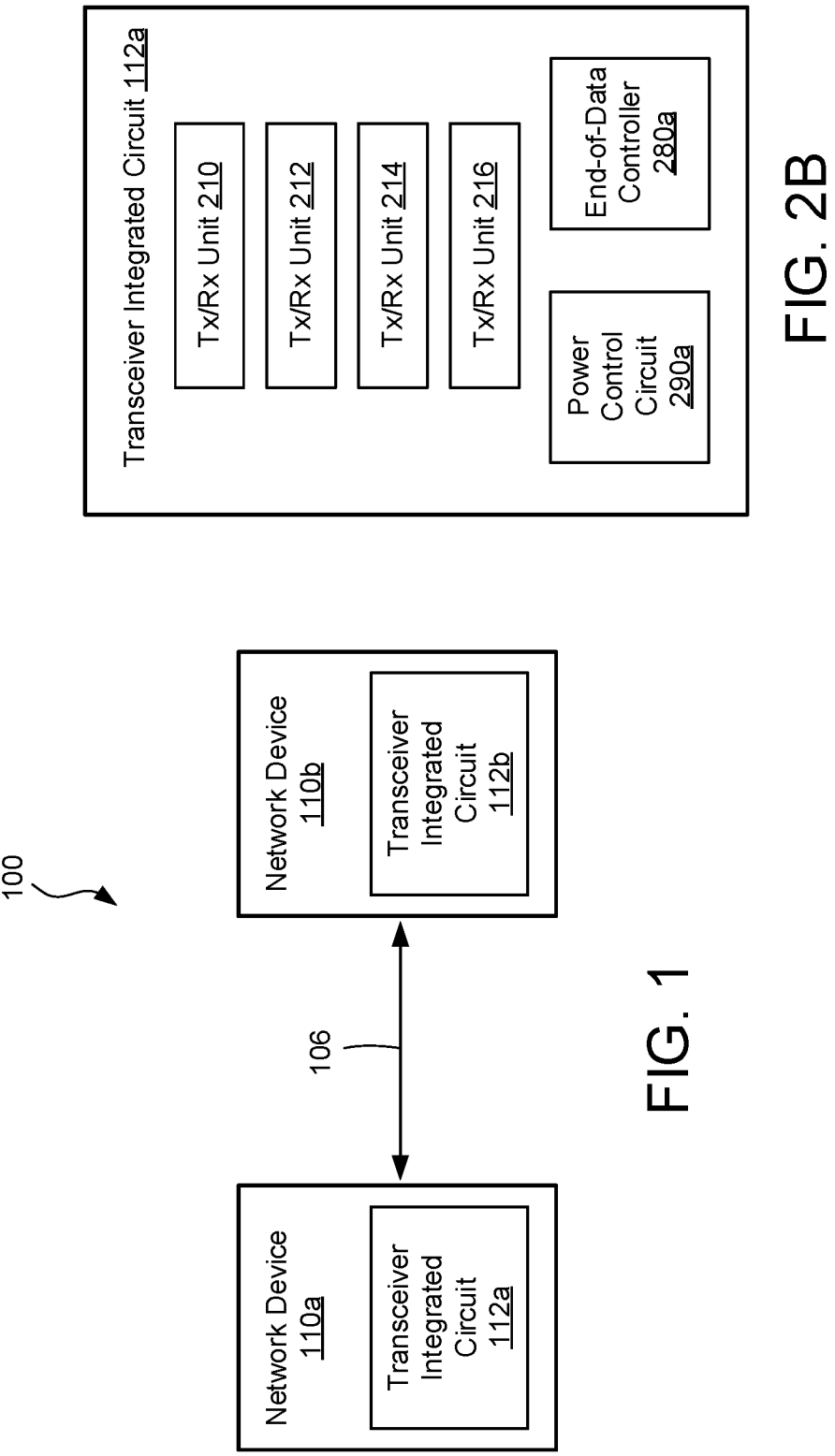

INEGRATED CIRCUITS AND METHOD FOR MAINTAINING A CHANNEL IN AN ALIVE STATE DURING LOW POWER MODES

CROSS-REFERENCE TO RELATED APPLICATIONS

This application is a continuation of U.S. patent application Ser. No. 15/228,161, filed Aug. 4, 2016, titled METHOD AND APPARATUS FOR ASYMMETRIC ETHERNET, which is a continuation of U.S. patent application Ser. No. 13/268,236, filed Oct. 7, 2011, titled METHOD AND APPARATUS FOR REDUCING POWER CONSUMPTION FOR DATA TRANSMISSION OVER ETHERNET, which is incorporated herein by reference in its entirety.

BACKGROUND

Technical Field

The disclosure herein relates generally to electronic communications, and more particularly, to high speed Ethernet systems.

Description of Related Art

A communication system permits communication between two or more network devices. Communication between network devices can be conventionally achieved using a communication line (or data link), formed by twisted pairs of wires (or cables), and transceivers, one transceiver positioned at each end of a twisted pair. For example, the IEEE 802.3an (10GBASE-T) standard targets data transmission rates with a total bandwidth of 10 Gbit/s over four (4) pairs of twisted wires for distances of up to 100 meters. The data transmission is generally performed in a simultaneous bidirectional fashion, thus each pair of wires simultaneously carries bidirectional data, each direction running effectively at a data rate of 2.5 Gbit/s. Simultaneous bi-directional signaling is often referred to as "full duplex" signaling.

One problem associated with using multiple twisted pairs of wires and multiple transceivers at a full duplex capacity is power consumption. Due to the bidirectional nature of a 10GBASE-T system, the transceivers remain operational at full speed in both directions at all times as long as a data link is "alive." This can waste a large amount of power, since the transceivers consume energy at full capacity even when there is little or no data being transmitted over the data link.

It is known in the art to reduce transceivers' power consumption by switching the transceivers from an "active" mode into a "low power idle (LPI)" mode when no data is being sent. This technique is employed by a variant of the 10GBASE-T standard, known as Energy Efficient Ethernet (EEE), as described in the IEEE 802.3az standard. During the LPI mode, an LPI refresh signal is sent periodically to refresh the low power idle mode. The data link is considered "asleep," but still "alive" and not "dead" or "switched off," so that full speed data transmission can be resumed at a relatively short time (within milliseconds) as compared to reestablishing a data link, which can take up to several seconds.

BRIEF DESCRIPTION OF DRAWINGS

The accompanying drawings illustrate several embodiments of the disclosure and, together with the description, serve to explain the principles described herein. One skilled in the art will recognize that the particular embodiments illustrated in the drawings are merely exemplary, and are not intended to limit the scope of the disclosure.

FIG. 1 is a block diagram illustrating a communication system configured for reducing power consumption for data transmission, according to one embodiment.

FIG. 2B is a block diagram illustrating a transceiver integrated circuit, according to one embodiment.

DETAILED DESCRIPTION

Figure 2A:
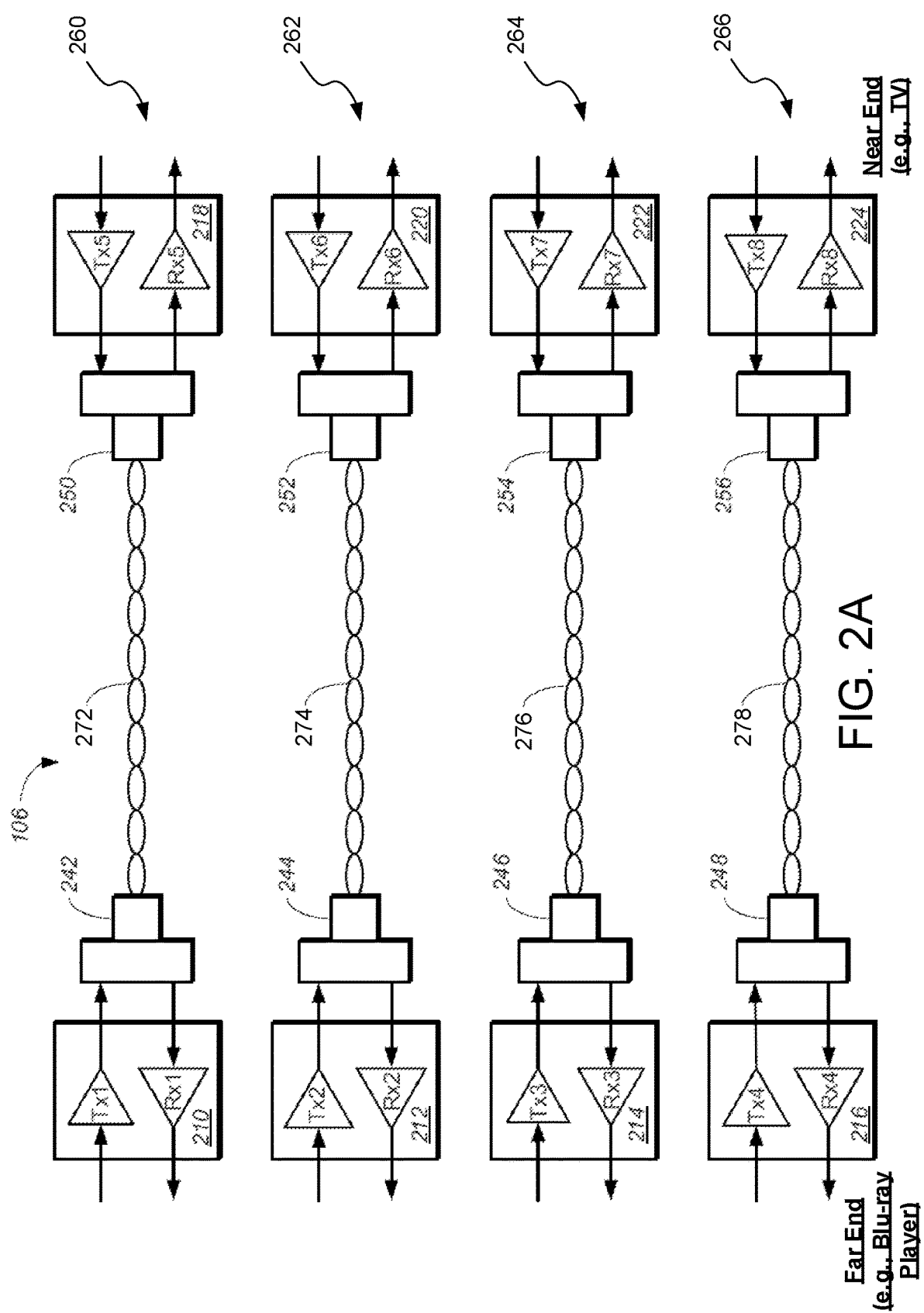
FIG. 2A is a schematic diagram illustrating one embodiment of the data link in the communication system of FIG. 1 in further detail, according to one embodiment.

In present embodiments, operation methods and apparatus for reducing power consumption in a 10GBASE-T transceiver circuit having transmit and receive circuitry for coupling to a plurality of physical channels are provided to transmit first data with the transmit circuitry in a first direction, receive second data with the receive circuitry in a second direction opposite to the first direction, identify an end-of-data indicator associated with the second data, and deactivate the receive circuitry according to the end-of-data indicator. Preferably, in some embodiments, the receive circuitry are selectively switched off to reduce power consumption. In accordance with one or more embodiments, a memory size of a memory device that the second data is fetched from can be discovered, and the end-of-data indicator can be determined based on the memory size.

FIG. 1 is a block diagram illustrating a communication system configured for reducing power consumption for data transmission, according to one embodiment. The communication system 100 includes network devices 110a and 110b. The network devices 110a and 110b are coupled in communication for data transmission over data link 106. For example, the components can be directly or indirectly connected via the Internet, a wide area network, a telephone network, any type of connection or connectionless network, and the like. One of ordinary skill in the art will understand that the components of FIG. 1 are just one implementation of the communication system within which present embodiments may be implemented, and the various alternative embodiments are within the scope and spirit of the disclosure herein. For example, there can be more than two network devices 110a,b, there can be more than one data link 106, and so forth.

The network devices 110a,b can be, for example, computers, switches, routers, hubs, gateways, and similar devices. In other embodiments, the network devices 110a,b can be, for example, a mobile device, a cell phone, a network-ready device, or any other device capable of connecting to a network. The network devices 110a,b transmit and receive data to and from each other through the data link 106. In accordance with present embodiments, one network device (e.g., 110*a*) can transmit data to the other network device (e.g., 110*b*) along the data link 106, and simultaneously receive data from the other network device (e.g., 110*b*) along the data link 106. One network device (e.g., 110*a*) can also identify an end-of-data indicator associated with the data transferred, and deactivate one or more transceiver portions associated with the transfer according to the end-of-data indicator. In one or more embodiments, the deactivation of the one or more transceiver portions results in power saving for the network devices 110*a,b*.

The network devices 110*a,b* further comprise transceiver integrated circuits 112*a,b*, respectively. The transceiver integrated circuits 112*a,b* can be implemented, for example, on a line card plugged into a chassis within the network devices 112*a,b*, or on a mother board. In one embodiment, the transceiver integrated circuits 112*a,b* are implemented on separate substrates. The transceiver integrated circuits 112*a,b* can be implemented with hardware, software, and/or firmware. In one embodiment, the transceiver integrated circuits 112*a,b* can be implemented with a programmable array or an ASIC. The transceiver integrated circuits 112*a,b* can contain analog electronic components, digital electronic components, or a combination of both. The two transceiver integrated circuits 112*a,b* need not be implemented in the same manner for synchronized operation. The network devices 110*a,b* can also comprise other computing components such as a processor, memory, and a monitor.

In operation, the transceiver integrated circuits 112*a,b* provide a layer 1 Open Systems Interconnection (OSI) model functionality, such as sending and receiving signals between a media access control (MAC) device or other layer 2 device and the data link 106. In some embodiments, transceiver integrated circuits 112*a,b* are respectively a part a physical layer (PHY) device. In one embodiment, the transceiver integrated circuits 112*a,b* send and receive digital signals from the MAC device, while sending and receiving analog signals with the data link 106. The transceiver integrated circuits 112*a,b* can be integrated with the MAC device or other components, in some embodiments. The transceiver integrated circuits 112*a,b* can simultaneously transmit and receive data independently over the data link 106. In one embodiment, the transceiver integrated circuits 112*a,b* are able to detect an end-of-data indicator associated with the transferred data, and deactivate the transceivers associated with transferring the data based on the end-of-data indicator. An implementation of the transceiver integrated circuits 112*a,b* is described below in more detail.

FIG. 2A is a schematic diagram illustrating one embodiment of the data link 106 in the communication system of FIG. 1 in further detail, according to one embodiment. The communication data link 106 includes four twisted pairs of wires 272-278 that are connected to transceiver units 210-224 including transceivers Tx1/Rx1-Tx8/Rx8 through corresponding connectors 242-256. In one implementation of present embodiments, the transceivers are IEEE 10GBASE-T compliant. Each twisted pair of wires and their associated transceiver units form a physical channel. For example, twisted pair 272 and its associated transceiver units 210,218 form a physical channel 260, twisted pair 274 and its associated transceiver units 212,220 form a physical channel 262, and so forth. The twisted pairs 272-278 can be composed of copper, optical fiber, or any other suitable transmission medium. When operating at a bandwidth of 10 Gbit/s, each of the twisted pairs 272-278 operates at approximately 2.5 Gbit/s in each direction, demanding significant power from the transceivers Tx1/Rx1-Tx8/Rx8 and supporting circuitry.

For purposes of explanation, the data link 106 has two ends, a near end and a far end, though a person of ordinary skill in the art would understand that the two ends of the data link are generally identical and interchangeable. Also for illustration purposes, in one embodiment the far end interfaces with a media player device such as a Blu-ray player for providing a video streaming service, and the near end interfaces with a monitor device such as a television or other visual screen for receiving the video streaming service. However, it is noted a Blu-ray player need not be on the far end, and vice versa.

FIG. 2B is a block diagram illustrating a transceiver integrated circuit 112*a* that includes transceiver units on one end (e.g., the far end) of the data link of FIG. 2A, according to one embodiment. The transceiver integrated circuit 112*a* includes transceiver units 210-216 comprising a plurality of transceivers, an end-of-data controller 280*a*, and a power control circuit 290*a*. The end-of-data controller 280*a* is coupled to the transceiver units 210-216 to detect an end-of-data indicator from data transferred (e.g., received), and control the deactivation of transceiver units 210-216 according to the end-of-data indicator. In many embodiments, the end-of-data indicator can be determined by discovering a memory size for a memory device (not shown) from which the data is fetched. In accordance with present embodiments, the power control circuit 290*a* is coupled to the end-of-data controller 280*a* to selectively deactivate the transceiver units 210-216. In one embodiment, the end-of-data controller 280*a* can command the power control circuit 290*a* to deactivate suitable transceiver portions in the transceiver units 210-216 by switching off the transceiver portions associated with the transfer (e.g., receiving). In another embodiment, the end-of-data controller 280*a* can command the power control circuit 290*a* to deactivate suitable transceiver portions in the transceiver units 210-216 by operating the transceiver portions associated with the transfer (e.g., receiving) in a low power idle (LPI) mode or a low power communication (LPC) mode.

Figure 3:
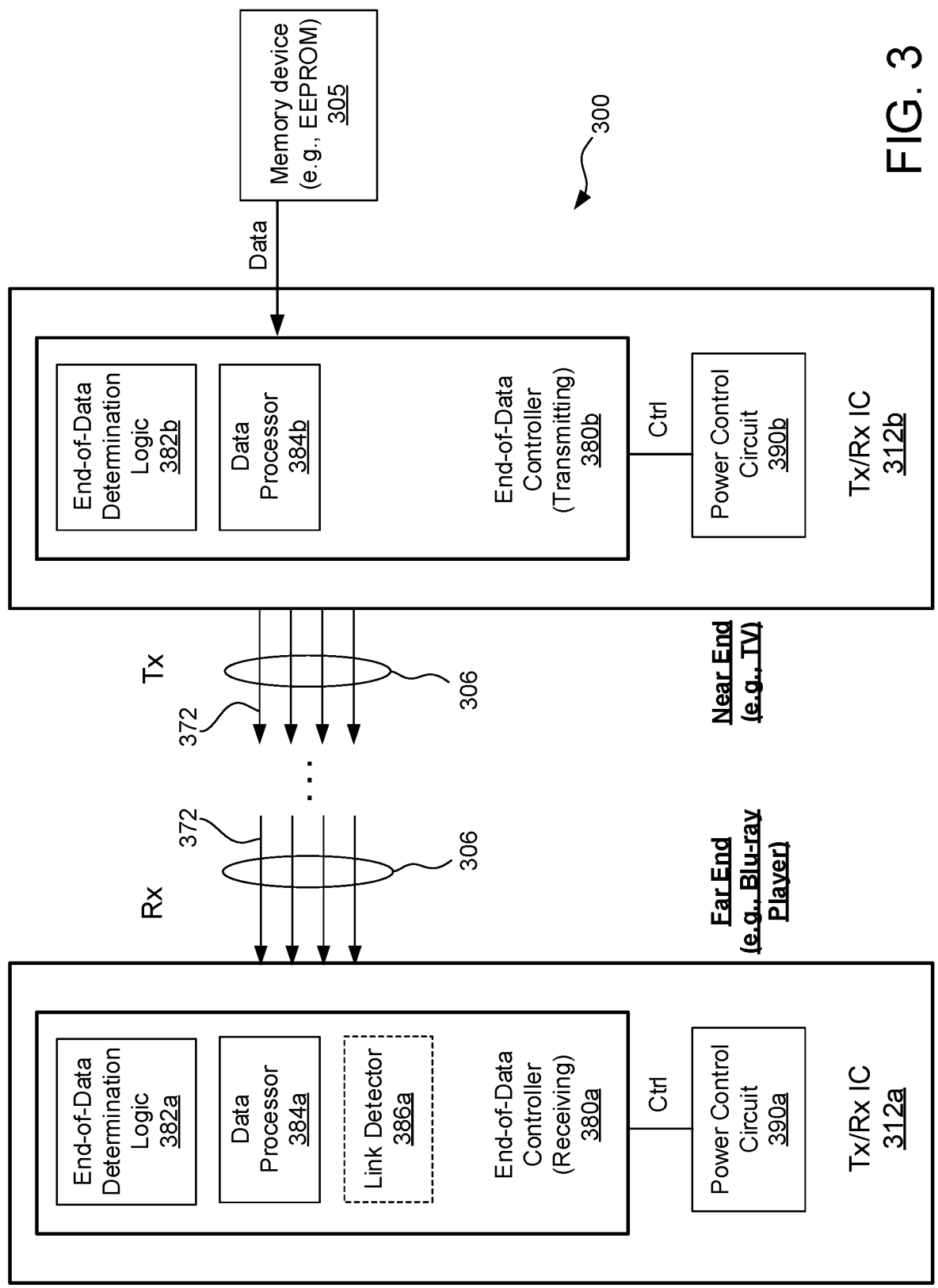
FIG. 3 is a block diagram illustrates an end-of-data controller configuration for data transmission in a communication system, according to one embodiment.

FIG. 3 is a block diagram illustrates an end-of-data controller configuration for data transmission in a communication system 300, according to one embodiment. The communication system 300 includes a data link 306 having a far end (e.g., interfaced to a Blu-ray player) and a near end (e.g., interfaced to a TV), a first transceiver integrated circuit 312*a* coupled to the far end of the data link 306, and a second transceiver integrated circuit 312*b* coupled to the near end of the data link 306. The communication system 300 further includes a memory device 305 coupled to the transceiver integrated circuit 312*b* for data transmission from the near end to the far end. For simplicity and a better understanding of present embodiments, in the following description regarding FIG. 3, only the data transmission from the near end (e.g., the TV) to the far end (e.g., the Blu-ray player) is explained. Nonetheless, a person of ordinary skill in the art would understand that a separate data transmission from the far end to the near end can operate independently.

The memory device 305 is a device that has a finite data storage, for example, an EEPROM, which is located on the near end (e.g., inside the TV). Typically, the memory device 305 stores data related to the hardware specification of the TV, for example, model name, serial number, supported resolution, screen size, etc. These pieces of information do not alter unless a different TV is connected to the Blu-ray player; therefore, during the entire video streaming session, these pieces of information only need to be transferred once to the Blu-ray player. More importantly, these pieces of information are data of a finite amount. Therefore, present embodiments can save power by identifying an end-of-data indicator associated with the data, and deactivating signal transceiver portions that are associated with transferring these pieces of data once the transfer is finished.

Now referring to the near end of the data link 306, the transceiver integrated circuit 312b includes an end-of-data controller 380b and a power control circuit 390b. The transceiver integrated circuit 312b further includes inputs to receive data from a MAC device or other layer 2 device (not shown), and is coupled to the data link 306 for data transmission. Specifically, the transceiver integrated circuit 312b receives data from a memory device 305 (e.g., an EEPROM) that is located on the near end (e.g., inside a TV). For purposes of explaining, the memory device 305 stores hardware specification information regarding the near end (e.g., the TV), and thus contains only a finite amount of data. Of course, other kinds of information may be stored in the memory device 305. For simplicity, the transceiver units as illustrated in FIG. 2B are not shown; however, it is to be understood that the physical channels (e.g., channel 372) in the data link 306 are each coupled to a respective transceiver unit for transmitting and receiving data.

The end-of-data controller 380b includes an end-of-data determination logic 382b and a data processor 384b. The data processor 384b is coupled to the data link 306 to identify an end-of-data indicator for the data received from the inputs of the transceiver integrated circuit 312b. The data processor 384b is also coupled to the end-of-data determination logic 382b to notify the end-of-data determination logic 382b if any end-of-data indicator is identified for the received data, and transfer information regarding the end-of-data indicator to the determination logic 382b.

The end-of-data determination logic 382b includes an input coupled to the data processor 384b to receive information regarding the end-of-data indicator, and an output coupled to the power control circuit 390b to deactivate transceiver portions. Based on the information, the determination logic 382b can deactivate one or more transceiver portions associated with the transmitting according to the information regarding the end-of-data indicator. If the information indicates that no end-of-data indicator is identified, meaning there can be more data to be received from the memory device 305, then the determination logic 382b keeps the transceivers in an active mode to transmit data. If the information indicates that the end-of-data indicator is identified, meaning there is no more data to be transmitted through the data link 306, then the determination logic 382a sends out control signals to command the power control circuit 390a to switch off or reduce the power consumption of suitable transceiver portions associated with transmitting. In this way, when data transmission ends, transceiver power consumption drops to a minimal level.

The power control circuit 390b includes a control port to receive control signals from the end-of-data determination logic 382b to deactivate one or more transceiver portions. In one embodiment, the power control circuit 390b deactivates the transceiver portions by switching off the transceiver power supplies. In other embodiments, the power control circuit 390b deactivates the transceiver portions by operating the transceiver portions in a low power idle (LPI) mode, as provided by the IEEE 802.3az standard.

Further, it is noted that these low power or switched off modes are just exemplary modes that the power control circuit 390b can employ in reducing the power consumption of the transceiver portions upon the command of the end-of-data determination logic 382b. It is therefore understood that, in some other embodiments, the power control circuit 390b can reduce the power consumption of the transceiver portions by operating the transceiver portions in other modes, including those not currently specified by the IEEE 802.3 Ethernet standards. For example, in one embodiment, the power control circuit 390b can operate the transceiver portions in a low power communication (LPC) mode, which provides methods for transferring data with low power consumption using a refresh signal structure similar to LPI refresh signals.

Now referring to the far end of the data link 306, the transceiver integrated circuit 312a includes an end-of-data controller 380a and a power control circuit 390a. The transceiver integrated circuit 312a further includes inputs to receive data from a MAC device or other layer 2 device (not shown), and is coupled to the data link 306 for data transmission. For simplicity, the transceiver units as illustrated in FIG. 2B are not shown in FIG. 3; however, it is to be understood that the physical channels (e.g., channel 372) in the data link 306 are each coupled to a respective transceiver unit for transmitting and receiving data.

The end-of-data controller 380a includes an end-of-data determination logic 382a, a data processor 384a, and optionally, a link detector 386a. The data processor 384a is coupled to the data link 306 to identify an end-of-data indicator associated with the data received from the inputs of the transceiver integrated circuit 312a. The data processor 384a is also coupled to the end-of-data determination logic 382a to notify the end-of-data determination logic 382a if any end-of-data indicator is identified for the received data, and transfer information regarding the end-of-data indicator to the determination logic 382a.

The end-of-data determination logic 382a includes an input coupled to the data processor 384a to receive information regarding the end-of-data indicator, and an output coupled to the power control circuit 390a to deactivate transceiver portions. Based on the information, the determination logic 382a can selectively deactivate one or more transceiver portions associated with the receiving according to the information regarding the end-of-data indicator. If the information indicates that no end-of-data indicator is identified, meaning there can be more data to be received through the data link 306, then the determination logic 382a keeps the transceivers in an active mode to receive data. If the information indicates that the end-of-data indicator is identified, meaning there is no more data to be received through the data link 306, then the determination logic 382a sends out control signals to command the power control circuit 390a to switch off or reduce the power consumption of suitable transceiver portions associated with receiving. In this way, when data transmission ends, transceiver power consumption drops to a minimal level.

The power control circuit 390a includes a control port to receive control signals from the end-of-data determination logic 382a to deactivate one or more transceiver portions. In one embodiment, the power control circuit 390a deactivates the transceiver portions by switching off transceiver power supplies. In other embodiments, the power control circuit 390a deactivates the transceiver portions by operating the transceiver portions in a low power idle (LPI) mode, as provided by the IEEE 802.3az standard.

Further, it is noted that these low power or switched off modes are just exemplary modes that the power control circuit 390a can employ in reducing the power consumption of the transceiver portions upon the command of the end-of-data determination logic 382a. It is therefore understood that, in some other embodiments, the power control circuit 390a can reduce the power consumption of the transceiver portions by operating the transceiver portions in other modes, including those not currently specified by the IEEE 802.3 Ethernet standards. For example, in one embodiment, the power control circuit 390a can operate the transceiver portions in a low power communication (LPC) mode, which provides methods for transferring data with low power consumption using a refresh signal structure similar to LPI refresh signals.

Because in some embodiments, the receiving portion of the transceivers on the far end is completely switched off, the link status cannot be determined from the receipt of data. Therefore, in such embodiments, the link detector 386a is coupled to the data link 306 to detect a disconnection of the physical channels (e.g., channel 372). If the data link 306 is disconnected, then the link detector 386a can notify the transceiver integrated circuit 312a to respond accordingly, for example, to stop transmitting data to the near end, or to prepare for reestablishing a new connection. In some embodiments, the link detector 386a monitors an echo of the data being transmitting on the data link 306 to detect whether the physical channels are disconnected. Of course, other methods of detecting a disconnection of the physical channels can be employed to facilitate the detection of the status of the physical channels.

Detailed operation of the communication system 300 is now described, according to present embodiments. For simplicity, only the operation that is related to transmission of the finite data is illustrated in and described with FIG. 3 (from the near end to the far end), as the operation of the other portion (from the far end to the near end) is the same with a typical 10GBASE-T communication system. It should also be understood that the transmitting portion and the receiving portion on the transceiver integrated circuits 312a,b function independently, so one portion may operate in a way that is independent of the other portion.

When transferring the data, one or more controllers (e.g., 380a,b) on the transceiver integrated circuits 312a,b can identify an end-of-data indicator associated with the transferred data, and selectively deactivate one or more transceiver portions associated with transferring the data according to the end-of-data indicator. According to one or more embodiments, one or more power control circuits (e.g., 390a,b) are coupled to the controllers to selectively switch off the transceiver portions that are associated with the transfer. According to other embodiments, one or more power control circuits (e.g., 390a,b) are coupled to the controllers to selectively operate the transceiver portions in an LPI mode or an LPC mode. In some embodiments, one or more detectors are coupled to the data link 306 to detect a disconnection of the physical channels (e.g., channel 372).

Figure 4:
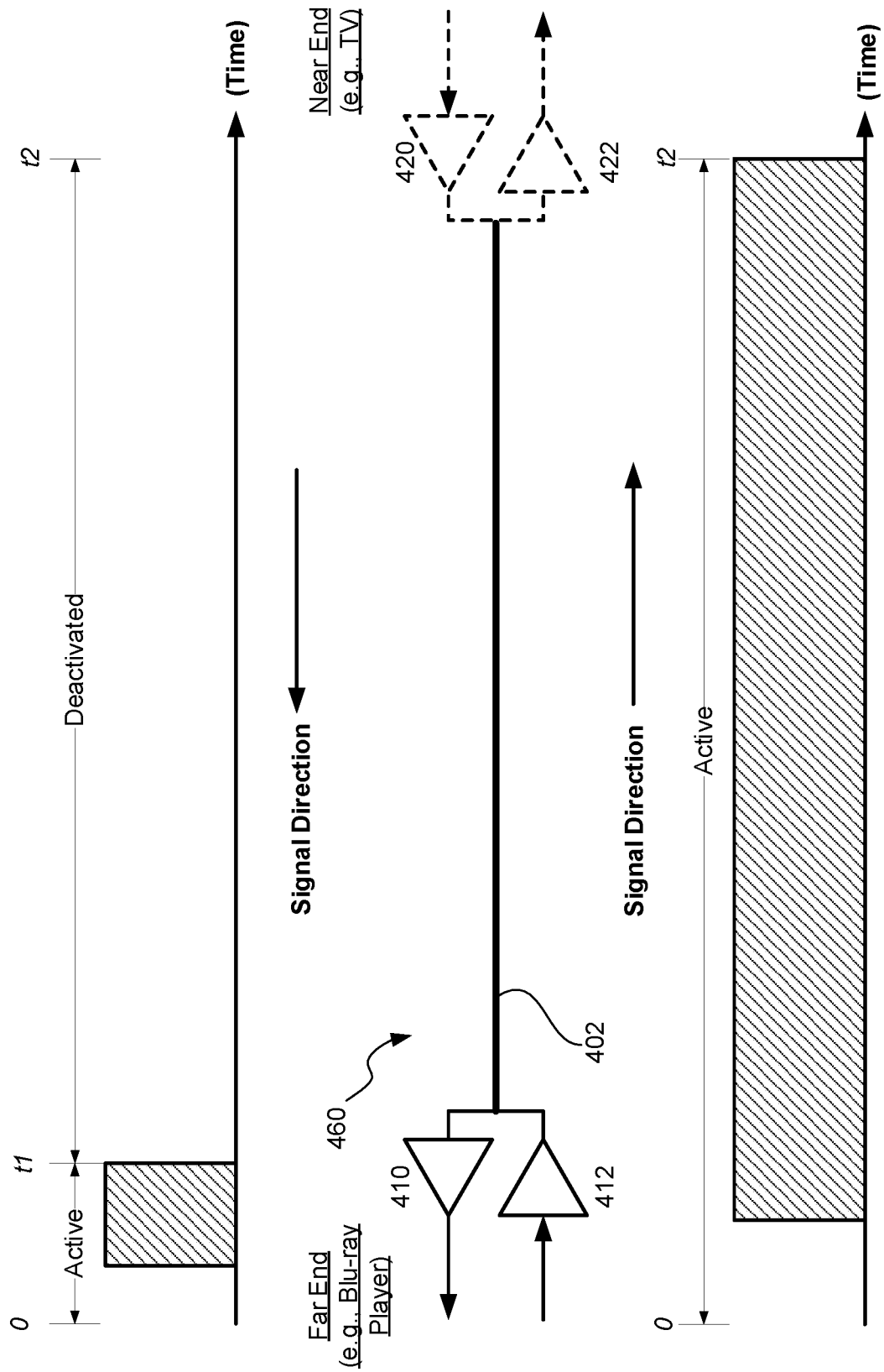
FIG. 4 is a diagram illustrating an embodiment performing an exemplary signal transmission over a physical channel.

FIG. 4 is a diagram illustrating an embodiment performing an exemplary signal transmission over a physical channel 460 corresponding to the physical channels 272, 274, 276, and 278. In one embodiment, the physical channel 460 includes a twisted pair of wires 402 having a far end (e.g., Blu-ray player) and a near end (e.g., TV). The far end includes a far end receiver 410 and a far end transmitter 412, which together form a far end transceiver. Similarly, the near end includes a near end transmitter 420 and a near end receiver 422, which together form a near end transceiver. It is noted that, in the following description regarding FIG. 4, present embodiments are explained from the far end's perspective. Therefore, the near end transceiver is shown in dotted lines.

As shown in FIG. 4, a large amount of data is transmitted from the far end (e.g., Blu-ray player) to the near end (e.g., TV) during time 0 to t2. On the contrary, only a small amount of data is received from the near end (e.g., TV) to the far end (e.g., Blu-ray player) during the same period. More specifically, there is no more data to be received by the far end after time t1. According to present embodiments, the far end transmitter 412 and the near end receiver 422 can each operate in the active mode at all times (from time 0 to time t2) for the Blu-ray player to transmit data to the TV. The far end receiver 410 and the near end transmitter 420 can both be switched off during the period between t1 and t2. Alternatively, the far end receiver 410 and the near end transmitter 420 can both operate in a low power idle (LPI) mode or a low power communication (LPC) mode. Therefore, in this period between t1 and t2, power consumption of the receiver 410 and the transmitter 420 in the present embodiments can be reduced.

Figure 5:
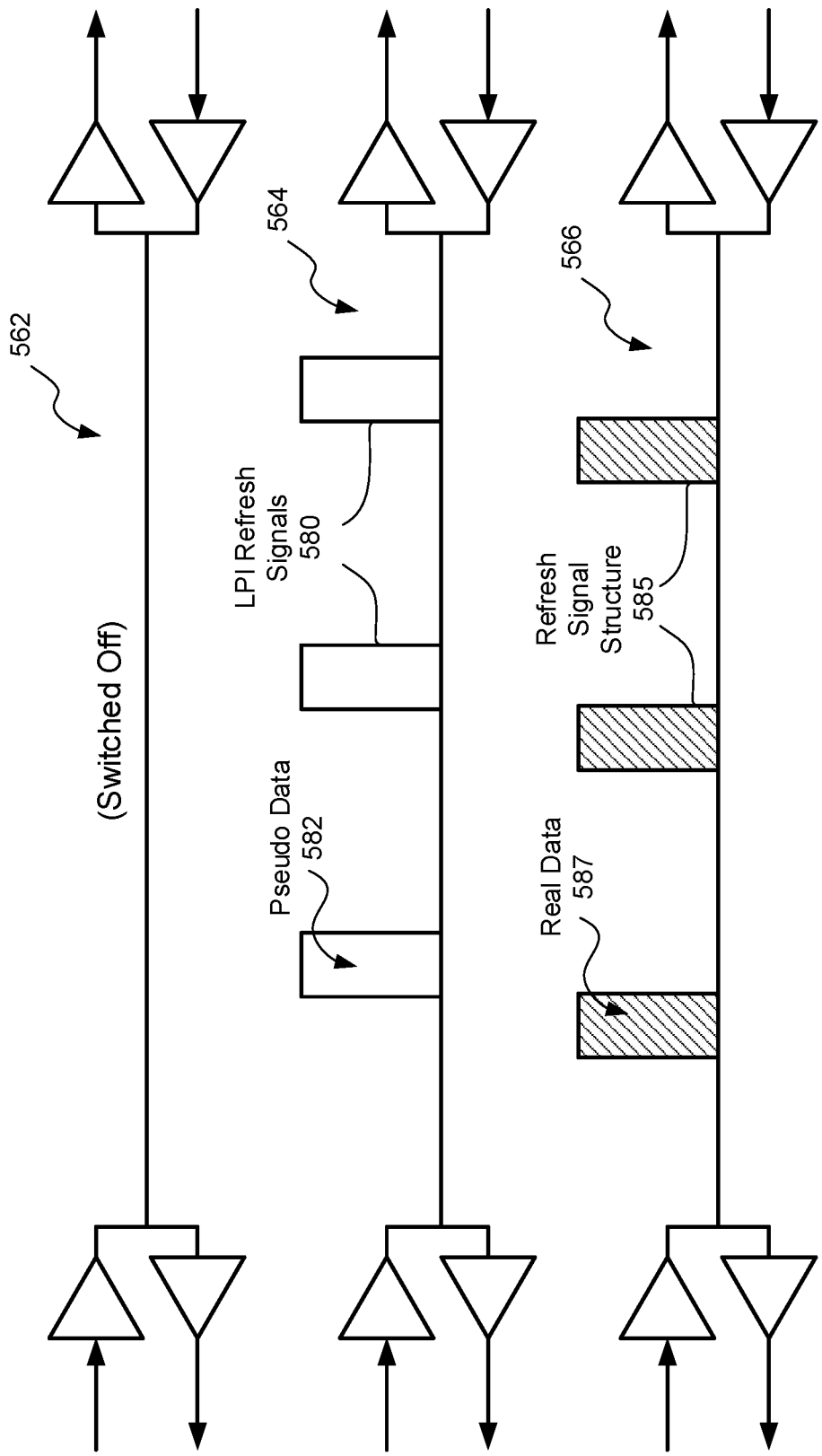
FIG. 5 is a diagram illustrating different modes for deactivating transceivers to reduce power consumption, according to some embodiments.

FIG. 5 is a diagram illustrating different modes for deactivating transceiver portions to reduce power consumption, according to some embodiments. In FIG. 5, three physical channels 562, 564 and 566 are shown with each associated with a pair of transceivers on each end of the physical channels. For simplicity, only signal transmission of one direction that is associated with finite data transmission is shown in FIG. 5. In present embodiments, the transceiver portions associated with the data transmission can be deactivated by their respective end-of-data controllers after end-of-data indicators are identified. Depending on the embodiments, there can be several possible modes for deactivating transceiver portions to achieve power savings. For one embodiment, as illustrated on the physical channel 562, after finishing the transmission of the data, transceiver portions associated with the data transmission on the physical channel 562 are switched off. For another embodiment, as illustrated on the physical channel 564, after finishing the transmission of the data, transceiver portions associated with the data transmission on the physical channel 564 operate in an LPI mode, transferring LPI refresh signals 580 on the physical channels 564 to keep the link "alive" while consuming very little energy.

In yet another embodiment, as illustrated on the physical channel 566, after finishing the transmission of the data, transceiver portions associated with the data transmission on the physical channel 566 operate in an LPC mode similar to the LPI mode. More specifically, in the current EEE standard, a sequence of scrambled one hundred and twenty eight (128) zeros are inserted in each LPI refresh signal 580 as pseudo data 582. Present embodiments may replace this pseudo data 582 with real data 587, and encode the real data 587 into a refresh signal structure 585. In this manner, the physical channel 566 is able to transmit data at a slower speed, with a reduced power consumption level similar to the LPI mode.

Again as described above, the transmitting and receiving are independent to each other in a communication system such as 10GBASE-T. Therefore, the communication system such as illustrated in FIG. 5 can save power by deactivating transceiver portions associated in transferring data in one direction after the data is transferred.

Figure 6:
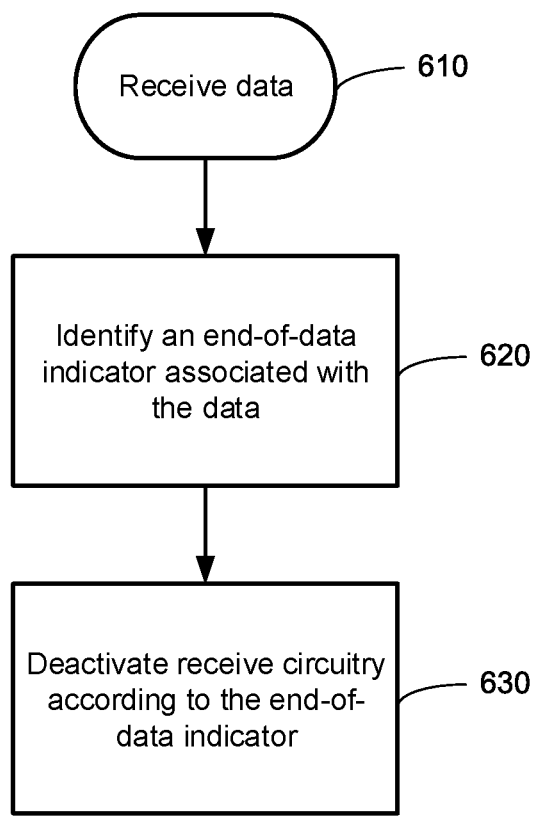
FIG. 6 is a flow chart illustrating a method for reducing power consumption for data transmission, according to one embodiment.

FIG. 6 is a flow chart illustrating a method for reducing power consumption for data transmission, according to one embodiment. With reference back to FIG. 3, an exemplary method for reducing power consumption for data transmission using an end-of-data controller (e.g., controller 380a) is now described.

First, the end-of-data controller 380a receives data (610). Then, the end-of-data determination logic 382a identifies an end-of-data indicator associated with the data (620). If the end-of-data indicator is not identified, meaning there can be more data to be received from the memory device 305, then the determination logic 382*a* keeps the transceivers in an active mode to receive data. If the end-of-data indicator is identified, meaning there is no more data to be received through the data link 306, then the determination logic 382*a* deactivates the receive circuitry of the transceivers according to the end-of-data indicator (630).

Advantageously, a communication system employing present embodiments can save power by reducing power consumption for finite data transmission. Pursuant to present embodiments, the power consumption associated with transferring a limited amount of data can be reduced, because the system need not operate the transceivers in active mode after the transfer of such data is finished. More specifically, after the transmission of the data, the transceiver portions associated with such transfer are switched off or their power is reduced. In this manner, unnecessary power consumption associated with operating the transceivers at full speed while not transferring any data is saved. Therefore, present embodiments can achieve great power saving in many applications, and in particular, video streaming through HDMI from a Blu-ray player to a TV.

While particular embodiments have been shown and described, it will be obvious to those skilled in the art that changes and modifications may be made without departing from this disclosure in its broader aspects and, therefore, the appended claims are to encompass within their scope all such changes and modifications as fall within the true spirit and scope of this disclosure.

Further, it should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media).

What is claimed is:

1. An integrated circuit (IC), comprising:
   a transceiver circuit, comprising:
   control circuitry configured to generate mode control signals for controlling portions of the transceiver circuit in a mode selected from i) a data transfer mode of operation, ii) a first low power mode of operation, and iii) a second low power mode of operation; and
   a transmit circuit coupled to the control circuitry, the transmit circuit being configured:
   in response to receiving a first mode control signal, to enter the data transfer mode of operation, and transmit first data over a first communication channel to a link partner;
   in response to receiving a second mode control signal, to enter the first low power mode of operation and transmit a first sequence of refresh signals, the first sequence of refresh signals exhibiting a first predefined refresh signal structure that is compliant with an Institute of Electrical and Electronics Engineers (IEEE) 802.3 refresh signal protocol, the refresh signals for maintaining the first communication channel in an alive state with the link partner; and
   in response to receiving a third mode control signal to enter the second low power mode of operation and selectively encode information into a second sequence of refresh signals, the second sequence of refresh signals exhibiting the first predefined refresh signal structure for maintaining the first communication channel in an alive state with the link partner, the encoded information comprising information signals other than that required to maintain the first communication channel alive during the second low power mode of operation, the transmit circuit to transmit the second sequence of refresh signals including the encoded information over the first communication channel to the link partner.

2. The IC of claim 1, wherein the transmit circuit is configured:
   to transmit the first data at a first power consumption level; and
   to transmit the second sequence of refresh signals at a second power consumption level that is less than the first power consumption level.

3. The IC of claim 1, wherein the transmit circuit is configured:
   during the second low power mode of operation, to selectively encode second data different from the first data as the information into the second sequence of refresh signals.

4. The IC of claim 3, wherein the transmit circuit is configured:
   to transmit the first data at a first data rate; and
   to transmit the second data at a second data rate that is less than the first data rate.

5. The IC of claim 3, wherein:
   the transmit circuit is configured during the second low power mode of operation to selectively encode non-pseudo data as the second data into the second sequence of refresh signals.

6. The IC of claim 3, wherein:
   the transmit circuit is configured during the second low power mode of operation to generate the second sequence of refresh signals as a sequence of bits, and to selectively encode the second data into the sequence of bits.

7. The IC of claim 3, further comprising:
   a receiver circuit coupled to the control circuitry and responsive to a fourth mode control signal to operate in the data transfer mode of operation, the receiver circuit configured to receive during the data transfer mode of operation third data over the first communication channel from the link partner.

8. The IC of claim 7, wherein:
   the receiver circuit receives the third data from the first communication channel concurrent with the transmit circuit transmitting the encoded second sequence of refresh signals to the first communication channel.

9. The IC of claim 1, embodied as a BASE-T Ethernet transceiver circuit.

10. An integrated circuit (IC), comprising:
    a first Ethernet transceiver circuit, comprising:

control circuitry configured to generate mode control signals for controlling portions of the transceiver circuit in a mode selected from i) a data transfer mode of operation, ii) a first low power mode of operation and (iii) a second low power mode of operation; and receiver circuitry coupled to the control circuitry, the receiver circuitry being configured:
  in response to receiving a first mode control signal, to enter the data transfer mode of operation, and to receive first data over a first wired coupling from a link partner;
  in response to receiving a second mode control signal, to enter the first low power mode of operation and receive a first sequence of refresh signals, the first sequence of refresh signals exhibiting a first predefined refresh signal structure that is compliant with an Institute of Electrical and Electronics Engineers (IEEE) 802.3 refresh signal protocol, the refresh signals for maintaining the first wired coupling in an alive state with the link partner; and
  in response to receiving a third mode control signal, to enter the second low power mode of operation and receive a second sequence of refresh signals, the second sequence of refresh signals exhibiting the first predefined refresh signal structure for maintaining the first wired coupling in an alive state with the link partner, the second sequence of refresh signals including encoded information comprising information signals other than that required to maintain the first wired coupling alive during the second low power mode of operation.

11. The IC of claim 10, wherein:
the first Ethernet transceiver circuit is configured during the data transfer mode of operation to receive the first data at a first power consumption level; and
the first Ethernet transceiver circuit is configured during the second low power mode of operation to receive the second sequence of refresh signals at a second power consumption level that is less than the first power consumption level.

12. The IC of claim 10, wherein the first Ethernet transceiver circuit is configured:
during the second low power mode of operation, to selectively decode second data different from the first data from the encoded information.

13. The IC of claim 12, wherein:
the first Ethernet transceiver circuit is configured during the second low power mode of operation to selectively decode non-pseudo data as the second data.

14. The IC of claim 12, wherein:
the first Ethernet transceiver circuit is configured during the second low power mode of operation to receive the second sequence of refresh signals as a sequence of bits, and to selectively decode the second data from the sequence of bits.

15. A method of operation in an integrated circuit (IC) transceiver, the method comprising:
generating mode control signals with control circuitry to control portions of the IC transceiver in a mode selected from i) a data transfer mode of operation, ii) a first low power mode of operation, and iii) a second low power mode of operation;
receiving a first mode control signal from the control circuitry with a transmit circuit;
operating the transmit circuit in the data transfer mode of operation in response to receiving the first mode control signal;
transmitting during the data transfer mode of operation first data over a first communication channel to a link partner;
receiving a second mode control signal from the control circuitry with the transmit circuit;
operating the transmit circuit in the first low power mode of operation in response to receiving the second mode control signal;
transmitting a first sequence of refresh signals during the first low power mode of operation, the first sequence of refresh signals exhibiting a first predefined refresh signal structure that is compliant with an Institute of Electrical and Electronics Engineers (IEEE) 802.3 refresh signal protocol, the refresh signals for maintaining the first communication channel in an alive state with the link partner; and
receiving a third mode control signal from the control circuitry with the transmit circuit;
operating the transmit circuit in the second low power mode of operation in response to receiving the third mode control signal;
selectively encoding information into a second sequence of refresh signals during the second low power mode of operation, the second sequence of refresh signals exhibiting the first predefined refresh signal structure for maintaining the first communication channel in an alive state with the link partner, the information comprising information signals other than that required to maintain the first communication channel alive during the second low power mode of operation; and
transmitting the second sequence of refresh signals including the encoded information over the first communication channel to the link partner.

16. The method of claim 15, wherein the selectively encoding information comprises:
selectively encoding second data different from the first data as the information into the second sequence of refresh signals.

17. The method of claim 16, wherein the selectively encoding second data comprises:
selectively encoding non-pseudo data as the second data into the second sequence of refresh signals.

18. The method of claim 16, wherein the selectively encoding second data comprises:
generating the second sequence of refresh signals as a sequence of bits; and
selectively encoding the second data into the sequence of bits.

* * * * *